(12) United States Patent
Eastwood et al.

(10) Patent No.: US 10,612,466 B2
(45) Date of Patent: Apr. 7, 2020

(54) GAS TURBINE ENGINE ACTIVE CLEARANCE CONTROL SYSTEM USING INLET PARTICLE SEPARATOR

(71) Applicant: United Technologies Corporation, Farmington, CT (US)

(72) Inventors: Jonathan Jeffery Eastwood, West Hartford, CT (US); Joseph F. Englehart, Gastonia, NC (US); Graham Ryan Philbrick, Durham, CT (US); Henry K. Webster, Jupiter, FL (US); Richard Seleski, Palm Beach Gardens, FL (US); ChaiDee Woods Brown, Boca Raton, FL (US); Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 208 days.

(21) Appl. No.: 15/700,328

(22) Filed: Sep. 11, 2017

(65) Prior Publication Data
US 2019/0078514 A1  Mar. 14, 2019

(51) Int. Cl.
*F02C 7/052* (2006.01)
*F01D 11/24* (2006.01)
(Continued)

(52) U.S. Cl.
CPC .............. *F02C 7/052* (2013.01); *B64D 33/02* (2013.01); *F01D 11/24* (2013.01); *F01D 25/246* (2013.01);
(Continued)

(58) Field of Classification Search
CPC . B64D 2033/0246; F01D 11/24; F01D 25/32; F02C 7/052
(Continued)

(56) References Cited

U.S. PATENT DOCUMENTS 3,362,681 A * 1/1968 Smuland ................. F01D 9/041
                                                    415/115
3,583,824 A * 6/1971 Smuland ................. F01D 11/18
                                                    415/117
(Continued)

FOREIGN PATENT DOCUMENTS

EP        2518278 A1 * 10/2012  ............... F01D 9/00
EP        2518278 A1   10/2012

OTHER PUBLICATIONS

European Search Report for European Application No. 18193764.0 dated Feb. 12, 2019.

*Primary Examiner* — Kevin R Steckbauer
(74) *Attorney, Agent, or Firm* — Carlson, Gaskey & Olds, P.C.

(57) ABSTRACT

A turbine section for a gas turbine engine includes blade outer air seals and stator vanes that provide a core flow path. A turbine case supports blade outer air seals and stator vanes. An annular cavity is provided between an interior surface of the turbine case and the blade outer air seals and the stator vanes. A hole extends through the turbine case from an exterior surface to the interior surface. The annular cavity extends axially to an exit. A manifold circumscribes the exterior surface of the turbine case and provides an annular space therebetween. The annular space is in fluid communication with the exit of the annular cavity via the hole.

11 Claims, 2 Drawing Sheets

(51) Int. Cl.
  *F02C 7/18* (2006.01)
  *F01D 25/32* (2006.01)
  *F01D 25/24* (2006.01)
  *B64D 33/02* (2006.01)
  *F02C 7/05* (2006.01)

(52) U.S. Cl.
  CPC ............... *F01D 25/32* (2013.01); *F02C 7/05* (2013.01); *F02C 7/18* (2013.01); *B64D 2033/0246* (2013.01); *F05D 2230/642* (2013.01); *F05D 2240/11* (2013.01); *F05D 2250/184* (2013.01); *F05D 2260/201* (2013.01); *F05D 2260/205* (2013.01); *F05D 2260/607* (2013.01)

(58) Field of Classification Search
  USPC .......................................................... 55/306
  See application file for complete search history.

(56) References Cited

U.S. PATENT DOCUMENTS

| | | | | |
|---|---|---|---|---|
| 3,628,880 A * | 12/1971 | Smuland | ................ | F01D 5/189 |
| | | | | 415/175 |
| 3,975,901 A * | 8/1976 | Hallinger | ................ | F01D 11/24 |
| | | | | 60/786 |
| 4,173,120 A * | 11/1979 | Grosjean | ................ | F01D 5/186 |
| | | | | 415/115 |
| 4,358,926 A * | 11/1982 | Smith | ................ | F02C 7/18 |
| | | | | 415/115 |
| 4,752,185 A * | 6/1988 | Butler | ................ | F01D 11/10 |
| | | | | 415/116 |
| 4,804,310 A * | 2/1989 | Fuller | ................ | F01D 11/16 |
| | | | | 415/115 |
| 4,841,726 A * | 6/1989 | Burkhardt | ................ | F01D 11/24 |
| | | | | 415/116 |
| 5,044,881 A | 9/1991 | Dodd et al. | | |
| 5,048,288 A * | 9/1991 | Bessette | ................ | F01D 11/24 |
| | | | | 415/116 |
| 5,098,257 A * | 3/1992 | Hultgren | ................ | F01D 5/18 |
| | | | | 415/115 |
| 5,593,277 A * | 1/1997 | Proctor | ................ | F01D 11/18 |
| | | | | 415/115 |
| 5,593,278 A * | 1/1997 | Jourdain | ................ | F01D 11/18 |
| | | | | 415/116 |
| 5,772,400 A * | 6/1998 | Pellow | ................ | F01D 11/24 |
| | | | | 415/173.1 |
| 5,779,436 A * | 7/1998 | Glezer | ................ | F01D 11/24 |
| | | | | 415/115 |
| 6,227,800 B1 * | 5/2001 | Spring | ................ | F01D 11/24 |
| | | | | 415/116 |
| 7,296,395 B1 * | 11/2007 | Hartman | ................ | B01D 45/04 |
| | | | | 244/53 B |
| 7,475,532 B2 * | 1/2009 | Corsmeier | ................ | F01D 17/143 |
| | | | | 60/226.3 |
| 7,658,061 B2 * | 2/2010 | Kawamoto | ................ | F02C 7/05 |
| | | | | 55/306 |
| 7,740,443 B2 * | 6/2010 | Seitzer | ................ | F01D 11/24 |
| | | | | 415/116 |
| 7,818,957 B2 * | 10/2010 | Corsmeier | ................ | F01D 17/143 |
| | | | | 60/204 |
| 8,424,279 B2 | 4/2013 | Rajamani et al. | | |
| 8,943,791 B2 * | 2/2015 | Tibbott | ................ | F01D 25/32 |
| | | | | 415/115 |
| 9,314,723 B2 * | 4/2016 | Judd | ................ | B01D 45/04 |
| 9,316,111 B2 * | 4/2016 | Eleftheriou | ................ | F01D 11/20 |
| 9,598,974 B2 | 3/2017 | Gekht et al. | | |
| 9,759,092 B2 * | 9/2017 | Moreton | ................ | F01D 9/00 |
| 9,945,250 B2 * | 4/2018 | Kitamura | ................ | F02C 7/18 |
| 10,012,147 B2 * | 7/2018 | Chang | ................ | F01D 9/023 |
| 10,138,752 B2 * | 11/2018 | Schilling | ................ | F01D 11/24 |
| 10,208,628 B2 * | 2/2019 | Nasir | ................ | F01D 25/32 |
| 10,245,540 B2 * | 4/2019 | Bisson | ................ | B01D 45/06 |
| 10,267,179 B2 * | 4/2019 | Manning | ................ | F04D 29/441 |
| 2007/0144139 A1 * | 6/2007 | Kawamoto | ................ | F02C 7/05 |
| | | | | 60/39.092 |
| 2008/0112797 A1 * | 5/2008 | Seitzer | ................ | F01D 11/24 |
| | | | | 415/116 |
| 2009/0035127 A1 * | 2/2009 | Corsmeier | ................ | F01D 17/143 |
| | | | | 415/145 |
| 2011/0067378 A1 * | 3/2011 | Tibbott | ................ | F01D 25/32 |
| | | | | 60/39.091 |
| 2012/0247121 A1 * | 10/2012 | Kitamura | ................ | F01D 25/14 |
| | | | | 60/785 |
| 2014/0234073 A1 * | 8/2014 | Moreton | ................ | F01D 9/00 |
| | | | | 415/1 |
| 2015/0040535 A1 | 2/2015 | Judd et al. | | |
| 2016/0215648 A1 | 7/2016 | Callaghan | | |
| 2016/0251981 A1 * | 9/2016 | Hashimoto | ................ | F01D 11/24 |
| | | | | 60/806 |
| 2017/0211475 A1 * | 7/2017 | Mayer | ................ | F02C 7/052 |
| 2017/0248028 A1 * | 8/2017 | Schilling | ................ | F01D 11/24 |
| 2017/0370326 A1 * | 12/2017 | Feulner | ................ | F02C 7/052 |
| 2018/0193782 A1 * | 7/2018 | Bisson | ................ | B01D 45/06 |
| 2018/0347464 A1 * | 12/2018 | Judd | ................ | F02C 7/052 |

* cited by examiner

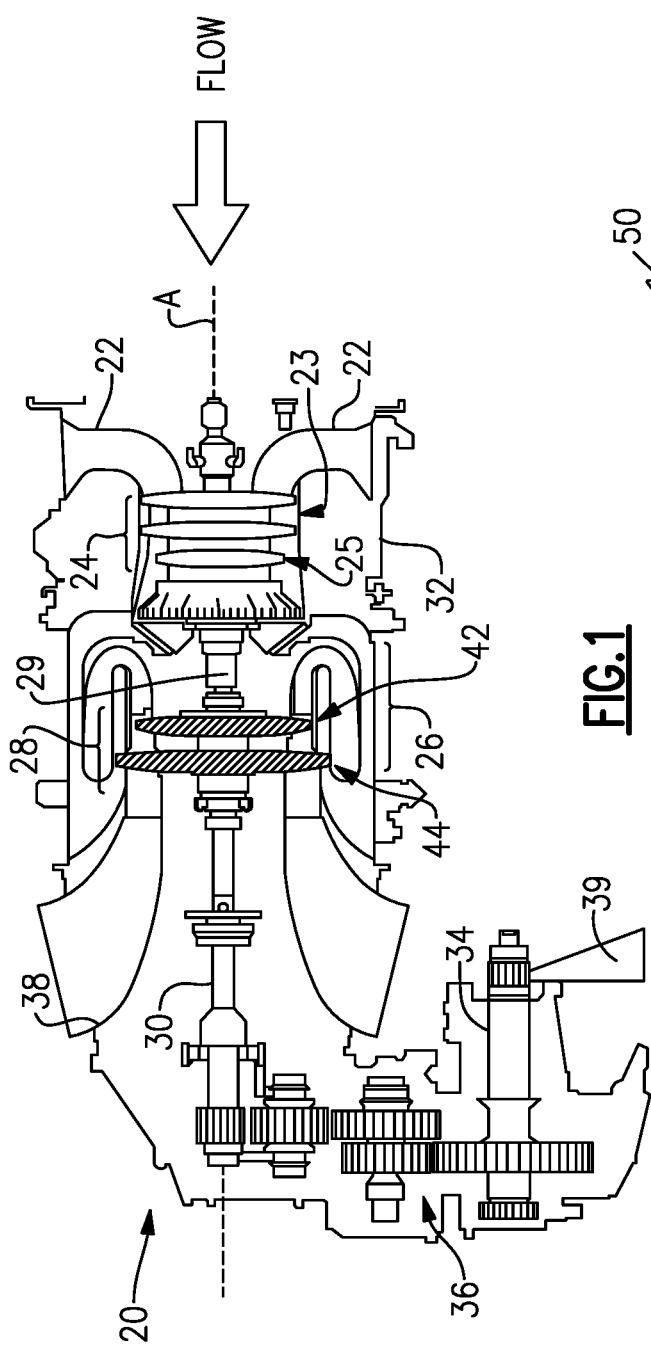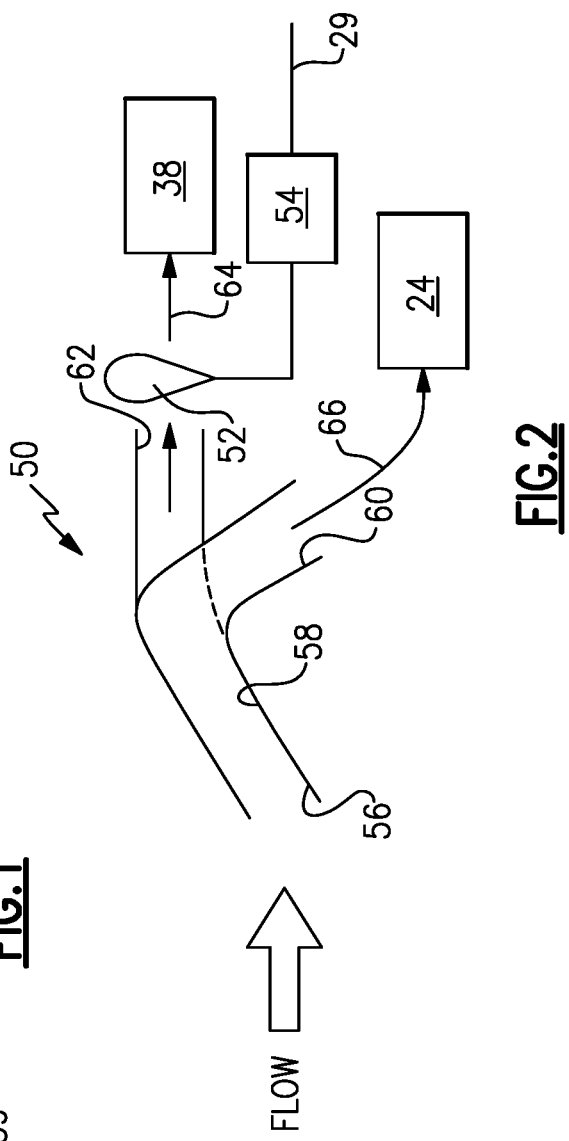

GAS TURBINE ENGINE ACTIVE CLEARANCE CONTROL SYSTEM USING INLET PARTICLE SEPARATOR

SPONSORED RESEARCH OR DEVELOPMENT

This invention was made with government support under contract number W911W6-16-2-0012 with the U.S. Army. The government has certain rights in the invention.

BACKGROUND

This disclosure relates to turbomachinery, and more particularly, the disclosure relates to an active clearance control system for a gas turbine engine.

Gas turbine engines include a compressor that compresses air, a combustor that ignites the compressed air and a turbine across which the compressed air is expanded. The expansion of the combustion products drives the turbine to rotate, which in turn drives rotation of the compressor.

In order to increase efficiency, a clearance between the tips of the blades in the compressor, turbine and power turbine across the outer diameter of the flowpath is kept sufficiently small. This ensures that a minimum amount of air passes between the tips and the outer diameter. Some engines include a blade outer air seal (BOAS) supported by case structure to further reduce tip clearance.

The clearance between the BOAS and the blade tips is sensitive to the temperature of the gas path at different engine conditions. If the BOAS support structure heats up at a faster rate than the rotating blades, the tip clearance could increase and cause a drop in efficiency. Conversely, if the blades heat up at a faster rate than the BOAS support structure, the blades can undesirably rub against the BOAS. As a result, it is difficult to accommodate a consistent tip clearance during different power settings in the engine.

Active clearance control (ACC) systems have been developed to selectively direct cooling fluid at the case structure to more closely control the clearance between the BOAS and blade tips. A simpler, more effective ACC system is needed.

Inlet particle separators are used at an inlet of some gas turbine engines that are exposed to a large amount of dust and debris. The inlet particle separator is used to separate out the debris from the core flowpath. Separated debris-laden air is expelled directly out through exhaust.

SUMMARY

In one exemplary embodiment, a turbine section for a gas turbine engine includes blade outer air seals and stator vanes that provide a core flow path. A turbine case supports blade outer air seals and stator vanes. An annular cavity is provided between an interior surface of the turbine case and the blade outer air seals and the stator vanes. A hole extends through the turbine case from an exterior surface to the interior surface. The annular cavity extends axially to an exit. A manifold circumscribes the exterior surface of the turbine case and provides an annular space therebetween. The annular space is in fluid communication with the exit of the annular cavity via the hole.

In a further embodiment of any of the above, the turbine case includes hooks that support the vanes and the blade outer air seals.

In a further embodiment of any of the above, at least one set of the hooks includes axially extending apertures configured to communicate air along the annular cavity from the hole to the exit.

In a further embodiment of any of the above, the holes are axially aligned with a last stator stage.

In a further embodiment of any of the above, the turbine section includes up to four rotor stages. The last stator stage is immediately axially upstream from a last rotor stage.

In a further embodiment of any of the above, seal structure is provided between the blade outer air seals and the turbine case and stator vanes. The seal structure encloses the annular space and separates the annular cavity from the core flow path.

In a further embodiment of any of the above, the turbine case includes forward and aft flanges. The manifold extends axially from and engages the forward and aft flanges.

In a further embodiment of any of the above, the manifold includes an annular plate that has holes in fluid communication with the annular cavity.

In a further embodiment of any of the above, the annular plate encloses an open end of an undulation in the manifold.

In a further embodiment of any of the above, an inlet tube is in fluid communication with the undulation and is axially aligned with the plate.

In another exemplary embodiment, an active clearance control system for a gas turbine engine includes an inlet which includes an inlet particle separator configured to separate debris from inlet air entering the inlet. Blade outer air seals and stator vanes provide a core flow path. A turbine case supports blade outer air seals and stator vanes. An annular cavity is provided between an interior surface of the turbine case and the blade outer air seals and the stator vanes. A hole extends through the turbine case from an exterior surface to the interior surface. The annular cavity extends axially to an exit. An exhaust case is secured to the turbine case. A manifold circumscribes the exterior surface of the turbine case and provides an annular space therebetween in fluid communication with the inlet particle separator. The annular space is in fluid communication with the exit of the annular cavity via the hole. The exit is in fluid communication with the exhaust case.

In a further embodiment of any of the above, the turbine case includes hooks that support the vanes and the blade outer air seals. At least one set of the hooks includes axially extending apertures configured to communicate air along the annular cavity from the hole to the exit. Seal structure is provided between the blade outer air seals and the turbine case and stator vanes. The seal structure encloses the annular space and separates the annular cavity from the core flow path.

In a further embodiment of any of the above, the holes are axially aligned with a last stator stage. The turbine section includes four rotor stages. The last stator stage is immediately axially upstream from the fourth rotor stage.

In a further embodiment of any of the above, the turbine case includes forward and aft flanges. The manifold extends axially from and engaging the forward and aft flanges.

In a further embodiment of any of the above, the manifold includes an annular plate having holes in fluid communication with the annular cavity. The annular plate encloses an open end of an undulation in the manifold and comprises an inlet tube in fluid communication with the undulation and is axially aligned with the plate. The inlet tube is configured to receive debris-laden air from the inlet particle separator.

In a further embodiment of any of the above, the exhaust case at least partially blocks the exit. The exhaust case includes outlets in fluid communication with the exit.

In a further embodiment of any of the above, the inlet particle separator includes a blower configured to be rotationally driven by the gas turbine engine.

In another exemplary embodiment, a method of actively controlling clearance between a blade outer air seal and a rotor blade. The method includes supplying debris-laden air from an inlet particle separator to a manifold of an active clearance control system. The debris-laden air passes from the manifold through a turbine case and into an annular space between the turbine case and blade outer air seals. The debris-laden air expels from the annular space to an engine exhaust.

In a further embodiment of any of the above, the method includes the step of generating the debris-laden air with a blower rotationally driven within the inlet particle separator.

In a further embodiment of any of the above, the expelling step includes passing the debris-laden air into the core flow downstream from a power turbine.

BRIEF DESCRIPTION OF THE DRAWINGS

The disclosure can be further understood by reference to the following detailed description when considered in connection with the accompanying drawings wherein:

FIG. 1 is a schematic view of a gas turbine engine for use in a helicopter.

FIG. 2 is a schematic cross-sectional view through an inlet particle separator of the gas turbine engine shown in FIG. 1.

Figure 3:
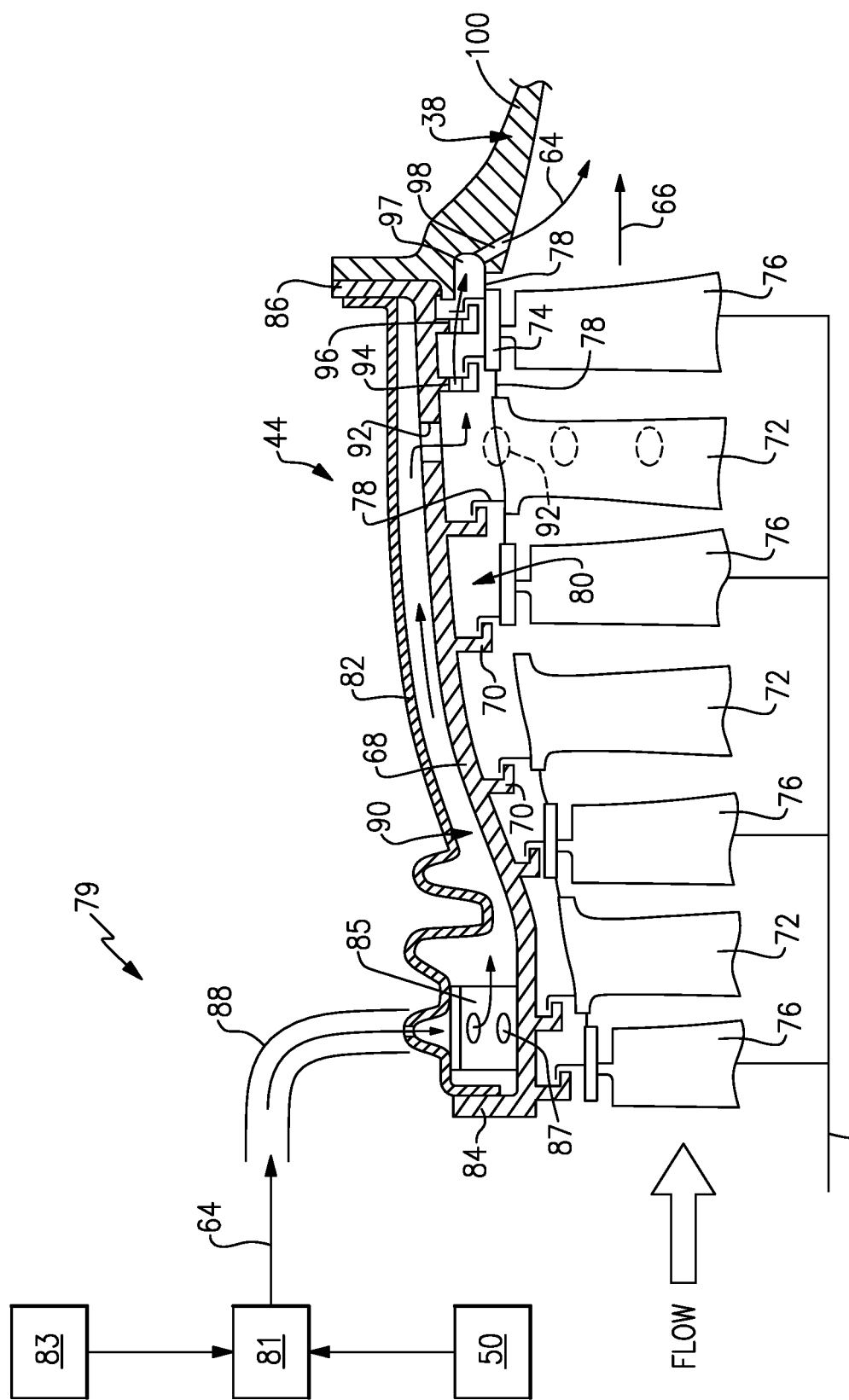
FIG. 3 is a schematic view of a portion of a turbine section shown in FIG. 1.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

FIG. 1 schematically illustrates a gas turbine engine 20. In this example, the engine 20 is a turboshaft engine, such as for a helicopter. The engine 20 includes an inlet duct 22 supplying inlet air to a core engine including a compressor section 24, a combustor section 26, and a turbine section 28.

The compressor section 24 is an axial compressor and includes a plurality of circumferentially-spaced blades. Similarly, the turbine section 28 includes circumferentially-spaced turbine blades. The compressor section 24 and the turbine section 28 are mounted on a main shaft 29 for rotation about an engine central longitudinal axis A relative to an engine static structure 32 via several bearing systems (not shown).

During operation, the compressor section 24 draws air through the inlet duct 22. Although gas turbine engines ingest some amount of dust, such engines are typically not designed for highly dusty environments. Engines such as the engine 20 are subject to operating in highly dusty environments during takeoff and landing. In this example, the inlet duct 22 has an opening radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which may include first and second turbine 42, 44. The first turbine 42 rotationally drives the compressor section 24 via a main shaft 29. The second turbine 44, which is a power turbine in the example embodiment, rotationally drives a power shaft 30, gearbox 36, and output shaft 34. The output shaft 34 rotationally drives the helicopter rotor blades 39 used to generate lift for the helicopter. The hot gas stream is expelled through an exhaust 38.

The engine 20 also includes a seal system in the turbine section 28 around the blades. Such a seal system may be referred to as a blade outer air seal (BOAS) 74 shown in FIG. 3. The seal system serves to provide a minimum clearance around the tips of the blades, to limit the amount of air that escapes around the tips.

Referring to FIG. 2, an example inlet particle separator (IPS) 50 is schematically shown. The IPS 50, which is fed by the inlet duct 22 (FIG. 1), includes an inlet 56 receiving inlet air for the engine 20. The inlet 56 includes a ramp 58 creating a tortuous flow path for the inlet air that will be used for the core engine.

A blower 52 is coupled to the shaft 29 with a coupler 54 that selectively rotationally affixes the blower 52 to the shaft 29. In this manner, the blower 52 may be driven when desired, and rotationally idled when undesired. However, it should be understood that the IPS 50 may use a blower that is constantly driven with the core engine. When the blower 52 is rotationally driven, the debris-laden air 64 is directed to an exhaust outlet 62, which is routed to the exhaust 38. Clean air is provided to a core outlet 60, which provides a core flow 66 to the compressor section 24 of the core engine.

The second, or power, turbine 44 is shown in more detail in FIG. 3. The power turbine 44 includes a turbine case 68, which is part of the engine static structure 32, that has hooks 70 provided at an inner surface used to support stator vanes 72 and blade outer air seals (BOAS) 74. The BOAS 74 seal with respect to the tips of rotor blades 76 that are axially interleaved between the stator vanes 72. As will be appreciated, the BOAS 74 may be an arc segment, a full ring, a split ring that is mounted around the blades 76, or an integration into an engine casing.

Seal structure 78 is provided between the stator vanes 72, BOAS 74 and turbine case 68. The seal structure 78 separates the annular space 80 from the core flow path.

An active clearance control (ACC) system 79 is used to selectively cool the turbine case 68. The ACC system 79 controls the running tip clearance of the blades 76 by varying the amount of cooling air on the turbine case 68. The ACC system 79 includes a manifold 82 that circumscribes an exterior surface of the turbine case 68. The debris-laden air 64 from the exhaust outlet 62 of the IPS 50 may be selectively supplied to the manifold 82 through a valve 81, particularly if the blower 52 is continually driven during engine operation. The valve 81 is selectively controlled by a controller 83 to maintain a desired clearance between the case structure 46 and the blades 76 to target a specific tip clearance value at a given power turbine speed. The controller 83 may receive inputs from various temperature sensors or other sensing elements (not shown).

The manifold 82 extends axially between and seals against forward and aft flanges 84, 86. An inlet tube 88 is fluidly connected to the manifold 82 to supply the fluid with debris-laden air 64 to the annular cavity 90 provided between the manifold 82 and the exterior surface of the turbine case 68.

The manifold 82 may be constructed from multiple pieces of sheet metal secured to one another in the example embodiment. In the example, the manifold 82 includes an annular plate 85 having holes 87 in fluid communication with the annular cavity 90. The annular plate 85 encloses an open end of an undulation in the manifold 82. The inlet tube 88 is in fluid communication with the undulation and is axially aligned with the plate 85. The manifold 82 is fed by the debris-laden air 64 from the IPS 50 when the blower 52 is driven and/or the valve 81 is opened. The debris-laden air 64 cools the turbine case 68.

Circumferentially arranged holes 92 are provided in the turbine case 68 and extend from the interior surface to the exterior surface. In the example illustrated, the holes 92 are axially aligned with the last stator stage, which is arranged immediately upstream of the last rotor stage, in the example, the fourth rotor stage. Fewer or more than four rotor stages may be used. First and second axially extending apertures 94, 96 are provided in axially spaced apart hooks 70 to provide a flowpath in the annular cavity 90 from the holes 92 to an exit 97 radially beneath the aft flange 86.

An exhaust case 100 is secured to the aft flange 86. The exhaust case 100 at least partially covers the exit 97. Outlets 98 are provided in the exhaust case 100 to fluidly connect the exit 97 to the core flow 66 entering the exhaust 38.

In operation, the debris-laden air 64 is generated with the blower 52 rotationally driven within the inlet particle separator 50. The debris-laden air 64 from the IPS 50 is supplied to the manifold 82. The debris-laden air 64 is then passed from the manifold 82 through the turbine case 68 and into the annular space 80 between the turbine case 68 and blade outer air seals 74. The debris-laden air 64 is expelled from the annular space 80 to the engine exhaust into the core flow 66 downstream from a power turbine 44. In this manner, the IPS is used to both separate debris and provide active clearance control.

Since the pressure and temperature of the debris-laden air 64 in the IPS 50 is close to ambient, the air needs to exit into the core flow 66 since there is not enough pressure gradient to have an impingement style ACC system. The ACC system 79 fed by the IPS 50 does not have a negative impact on the engine cycle since the IPS blower 52 is operating along with the engine. The IPS 50 dumps the air and solid particles through the engine exhaust 38. The IPS 50 uses centrifugal force to remove the solid particles like sand, rocks and other debris from the air which enters the core engine. It may not be desirable to use the IPS 50 air for BOAS clearance control during takeoff, since the IPS air may be too debris-laden.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A turbine section for a gas turbine engine, comprising:
    blade outer air seals and stator vanes providing a core flow path;
    a turbine case supporting the blade outer air seals and the stator vanes, an annular cavity provided between an interior surface of the turbine case and the blade outer air seals and the stator vanes, and a hole extending through the turbine case from an exterior surface to the interior surface, the annular cavity extending axially to an exit; and
    a manifold circumscribing the exterior surface of the turbine case and providing an annular space therebetween, the annular space is in fluid communication with the exit of the annular cavity via the hole, wherein the manifold includes an annular plate having orifices in fluid communication with the annular cavity, wherein the annular plate encloses an open end of an undulation in the manifold.

2. The turbine section according to claim 1, comprising an inlet tube in fluid communication with the undulation and which is axially aligned with the plate.

3. The turbine section according to claim 1, wherein the turbine case includes hooks that support the stator vanes and the blade outer air seals.

4. The turbine section according to claim 3, wherein at least one set of the hooks includes axially extending apertures configured to communicate air along the annular cavity from the hole to the exit.

5. The turbine section according to claim 1, wherein the hole is one of a multiple of holes arranged in a circumferential array in the turbine case, the multiple of holes are axially aligned with a last stator stage.

6. The turbine section according to claim 4, wherein the turbine section includes up to four rotor stages, and the last stator stage is immediately axially upstream from a last rotor stage.

7. The turbine section according to claim 1, wherein seal structure is provided between the blade outer air seals and the turbine case and stator vanes, the seal structure enclosing the annular space and separating the annular cavity from the core flow path.

8. The turbine section according to claim 1, wherein the turbine case includes forward and aft flanges, the manifold extending axially from and engaging the forward and aft flanges.

9. An active clearance control system for a gas turbine engine, comprising:
    an inlet including an inlet particle separator configured to separate debris from inlet air entering the inlet;
    blade outer air seals and stator vanes providing a core flow path;
    a turbine case supporting the blade outer air seals and the stator vanes, an annular cavity provided between an interior surface of the turbine case and the blade outer air seals and the stator vanes, and a hole extending through the turbine case from an exterior surface to the interior surface, the annular cavity extending axially to an exit;
    an exhaust case secured to the turbine case; and
    a manifold circumscribing the exterior surface of the turbine case and providing an annular space therebetween in fluid communication with the inlet particle separator, the annular space is in fluid communication with the exit of the annular cavity via the hole, the exit in fluid communication with the exhaust case, wherein the turbine case includes hooks that support the stator vanes and the blade outer air seals, wherein at least one set of the hooks includes axially extending apertures configured to communicate air along the annular cavity from the hole to the exit, wherein seal structure is provided between the blade outer air seals and the turbine case and stator vanes, the seal structure enclosing the annular space and separating the annular cavity from the core flow path.

10. An active clearance control system for a gas turbine engine, comprising:

an inlet including an inlet particle separator configured to separate debris from inlet air entering the inlet;

blade outer air seals and stator vanes providing a core flow path;

a turbine case supporting the blade outer air seals and the stator vanes, an annular cavity provided between an interior surface of the turbine case and the blade outer air seals and the stator vanes, and a hole extending through the turbine case from an exterior surface to the interior surface, the annular cavity extending axially to an exit;

an exhaust case secured to the turbine case;

a manifold circumscribing the exterior surface of the turbine case and providing an annular space therebetween in fluid communication with the inlet particle separator, the annular space is in fluid communication with the exit of the annular cavity via the hole, the exit in fluid communication with the exhaust case, wherein the manifold includes an annular plate having holes in fluid communication with the annular cavity, wherein the annular plate encloses an open end of an undulation in the manifold; and an inlet tube in fluid communication with the undulation and which is axially aligned with the plate, the inlet tube configured to receive debris-laden air from the inlet particle separator.

11. The system according to claim 10, wherein the turbine case includes forward and aft flanges, the manifold extending axially from and engaging the forward and aft flanges.

* * * * *

UNITED STATES PATENT AND TRADEMARK OFFICE
CERTIFICATE OF CORRECTION

PATENT NO. : 10,612,466 B2
APPLICATION NO. : 15/700328
DATED : April 7, 2020
INVENTOR(S) : Jonathan Jeffery Eastwood et al.

Page 1 of 1

It is certified that error appears in the above-identified patent and that said Letters Patent is hereby corrected as shown below:

In the Claims

In Claim 10, Column 8, Line 1; replace "the exterior surf ace" with --the exterior surface--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*